US010907003B2

(12) United States Patent
Lee

(10) Patent No.: US 10,907,003 B2
(45) Date of Patent: Feb. 2, 2021

(54) METHOD FOR PREPARING NITRILE-BASED RUBBER

(71) Applicant: LG Chem, Ltd., Seoul (KR)

(72) Inventor: Jae Min Lee, Daejeon (KR)

(73) Assignee: LG Chem, Ltd.

( * ) Notice: Subject to any disclaimer, the term of this patent is extended or adjusted under 35 U.S.C. 154(b) by 141 days.

(21) Appl. No.: 16/315,049

(22) PCT Filed: Dec. 19, 2017

(86) PCT No.: PCT/KR2017/015052
§ 371 (c)(1),
(2) Date: Jan. 3, 2019

(87) PCT Pub. No.: WO2018/124596
PCT Pub. Date: Jul. 5, 2018

(65) Prior Publication Data
US 2019/0309116 A1    Oct. 10, 2019

(30) Foreign Application Priority Data

Dec. 26, 2016  (KR) .................. 10-2016-0179063
Dec. 15, 2017  (KR) .................. 10-2017-0173290

(51) Int. Cl.
| | |
|---|---|
| *C08F 236/12* | (2006.01) |
| *C08C 1/14* | (2006.01) |
| *C08F 2/26* | (2006.01) |
| *C08K 5/092* | (2006.01) |
| *C08F 2/22* | (2006.01) |
| *C08K 3/04* | (2006.01) |
| *C08F 6/22* | (2006.01) |

(52) U.S. Cl.
CPC .............. *C08F 236/12* (2013.01); *C08C 1/14* (2013.01); *C08F 2/22* (2013.01); *C08F 2/26* (2013.01); *C08F 6/22* (2013.01); *C08K 3/04* (2013.01); *C08K 5/092* (2013.01)

(58) Field of Classification Search
CPC .. C08F 236/12; C08F 2/22; C08F 6/22; C08F 2/26; C08F 2/24; C08K 5/092; C08K 3/04; C08C 1/14
See application file for complete search history.

(56) References Cited

U.S. PATENT DOCUMENTS

| | | | |
|---|---|---|---|
| 2,876,203 A | * | 3/1959 | Miller ............... C08F 36/04 524/774 |
| 4,452,936 A | | 6/1984 | Grimm |
| 2003/0092803 A1 | | 5/2003 | Vanhoorne et al. |
| 2004/0214933 A1 | | 10/2004 | O'Rourke et al. |
| 2007/0077443 A1 | | 4/2007 | O'Rourke et al. |
| 2008/0293868 A1 | | 11/2008 | Obrecht |
| 2014/0377700 A1 | | 12/2014 | Mine et al. |
| 2017/0355854 A1 | | 12/2017 | Inoue et al. |

FOREIGN PATENT DOCUMENTS

| | | | |
|---|---|---|---|
| EP | 0714949 | * 6/1996 | ........... C08F 279/02 |
| EP | 0714949 A2 | 6/1996 | |
| EP | 2009050 A1 | 12/2008 | |
| EP | 3239265 A1 | 11/2017 | |
| JP | S47030300 B | 8/1972 | |
| JP | S58210941 A | 12/1983 | |
| JP | H08253652 A | 10/1996 | |
| JP | H11511427 A | 10/1999 | |
| JP | 2003527473 A | 9/2003 | |
| JP | 2004285293 A | 10/2004 | |
| JP | 2014024924 A | 2/2014 | |
| JP | 2015004831 | 1/2015 | |
| KR | 19860003279 B1 | 5/1986 | |
| KR | 20030090388 A | 11/2003 | |
| KR | 20120120628 A | 11/2012 | |
| KR | 101239486 B1 | 3/2013 | |
| KR | 20150067744 A | 6/2015 | |
| WO | 2016104350 A1 | 6/2016 | |

OTHER PUBLICATIONS

Extended European Search Report including the Written Opinion for Application No. EP 17889168.5 dated Jul. 12, 2019, pp. 1-6.
Search report from International Application No. PCT/KR2017/015052, dated Apr. 5, 2018.
Chinese Search Report for Application No. 201780045686.8, dated Sep. 30, 2020, pp. 1-2.

* cited by examiner

Primary Examiner — Robert C Boyle
(74) Attorney, Agent, or Firm — Lerner, David, Littenberg, Krumholz & Mentlik, LLP

(57) ABSTRACT

The present invention relates to a method for preparing a nitrile-based rubber, by which the nitrile-based rubber is prepared by polymerizing a monomer mixture comprising an α,β-unsaturated nitrile-based monomer and a conjugated diene-based monomer, in the presence of an initiator and an emulsifier comprising a $C_{30}$ to $C_{60}$ compound having two or more carboxyl groups, a nitrile-based rubber prepared thereby, and a nitrile-based rubber composition comprising the nitrile-based rubber.

20 Claims, No Drawings

METHOD FOR PREPARING NITRILE-BASED RUBBER

CROSS-REFERENCE TO RELATED APPLICATION

The present application is a national phase entry under 35 U.S.C. § 371 of International Application No. PCT/KR2017/015052 filed Dec. 19, 2017, which claims priority from Korean Patent Application Nos. 10-2016-0179063 filed Dec. 26, 2016 and Korean Patent Application No. 10-2017-0173290 filed Dec. 15, 2017, all of which are incorporated herein by reference.

TECHNICAL FIELD

The present invention relates to a method for preparing a nitrile-based rubber, and more particularly, to a method for preparing a nitrile-based rubber using an emulsifier comprising a $C_{30}$ to $C_{60}$ compound having two carboxyl groups.

BACKGROUND ART

In general, a nitrile-based rubber is a polymer prepared by copolymerizing an α,β-unsaturated nitrile-based monomer such as acrylonitrile (ACN) and a conjugated diene-based monomer such as butadiene It is known that the nitrile-based rubber has excellent oil resistance due to the use of an α,β-unsaturated nitrile-based monomer including a highly polar nitrile group, specifically, acrylonitrile, during preparation. Also, the content of the α,β-unsaturated nitrile-based monomer included in the nitrile-based rubber affects various vulcanization properties of the nitrile-based rubber. Specifically, in the case where acrylonitrile is used as the α,β-unsaturated nitrile-based monomer, when the content of the acrylonitrile in the nitrile-based rubber is increased, resistance to hydrocarbon fuels and petroleum-based fluids is increased, and heat resistance, ozone resistance, wear resistance, tensile strength, hardness, and density are increased, but low temperature flexibility, rebound resilience, and gas permeability are decreased.

Nitrile-based rubbers are classified into 5 grades including a low nitrile (content of ACN in the rubber: 18 to 20%), a medium to low nitrile (content of ACN in the rubber: 28 to 29%), a medium nitrile (content of ACN in the rubber: 33 to 34%), a high nitrile (content of ACN in the rubber: 38 to 39%), and an ultra-high nitrile (content of ACN in the rubber: 45 to 48%), according to the content of the α,β-unsaturated nitrile-based monomer, for example, acrylonitrile (ACN). In general, the high nitrile and the ultra-high nitrile are used in areas in which resistance to hydrocarbons having a high aromatic content, such as gasoline, is required. Also, the medium nitrile is used in a case where swelling of a rubber product is not an issue or oil has a low aromatic content. The low nitrile and the medium to low nitrile are mainly used in the preparation of liquids having an insignificant swelling effect, such as paraffin oil or polyalphaolefin, or foamed heat insulating materials and hoses and the like, requiring low temperature characteristics such as low temperature resistance.

Meanwhile, in the case of an emulsifier used during the emulsion polymerization of the nitrile-based rubber, a $C_{12}$-$C_{18}$ fatty acid including a monocarboxyl group or a rosin is mainly used. In the case of the emulsifier, during the emulsion polymerization, a relatively excessive amount of the emulsifier is introduced, and most of the emulsifier remains as an impurity in the nitrile-based rubber. For this reason, problems in that mechanical properties of a nitrile-based rubber prepared by emulsion polymerization deteriorate and the glass transition temperature range is broadened occur. Further, due to these problems, there are disadvantages in that the area to which the nitrile-based rubber is applied is limited and it is difficult to process the nitrile rubber.

DISCLOSURE

Technical Problem

An object of the present invention is to provide a method for preparing a nitrile-based rubber in which an amount of emulsifier used is decreased by using an emulsifier having a low critical micelle concentration and high thermal stability during polymerization.

An object of the present invention is to provide a method for preparing a nitrile-based rubber, by which it is possible to prepare a nitrile-based rubber having excellent mechanical properties by decreasing impurities in the nitrile-based rubber.

Technical Solution

In order to solve the problems, the present invention provides a method for preparing a nitrile-based rubber, by which the nitrile-based rubber is prepared by polymerizing a monomer mixture comprising an α,β-unsaturated nitrile-based monomer and a conjugated diene-based monomer, in the presence of an initiator; and an emulsifier comprising one or more compounds represented by the following Chemical Formula 1:

<Chemical Formula 1>

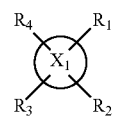

In Chemical Formula 1, $X_1$ is a $C_6$ to $C_{20}$ tetravalent aromatic hydrocarbon or a $C_2$ to $C_{10}$ tetravalent aliphatic hydrocarbon, $R_1$ to $R_4$ are the same as or different from each other, and each independently a $C_2$ to $C_{20}$ monovalent aliphatic hydrocarbon, two of $R_1$ to $R_4$ are represented by —$R_5$—COOH, and $R_5$ is a $C_2$ to $C_{20}$ divalent aliphatic hydrocarbon, one or more of $R_1$ to $R_5$ comprise or do not comprise at least one unsaturated bond, and a total sum of carbon atoms of $X_1$ and $R_1$ to $R_4$ is 30 to 60.

Further, the present invention provides a nitrile-based rubber prepared by the method for preparing a nitrile-based rubber.

In addition, the present invention provides a nitrile-based rubber composition comprising the nitrile-based rubber.

Advantageous Effects

With the method for preparing a nitrile-based rubber according to the present invention, emulsion polymerization can be smoothly carried out a smaller amount than the amount of a conventional emulsifier by using an emulsifier comprising a compound having 30 to 60 carbon atoms and having two carboxyl groups and having a low critical micelle concentration and excellent thermal stability.

Furthermore, mechanical properties of a nitrile-based rubber prepared by the method for preparing a nitrile-based rubber according to the present invention can be improved because the content of impurities derived from an emulsifier is decreased.

BEST MODES FOR CARRYING OUT THE INVENTION

Hereinafter, the present invention will be described in more detail in order to help the understanding of the present invention.

The terms or words used in the present specification and the claims should not be construed as being limited to typical or dictionary meanings, and should be construed as meanings and concepts conforming to the technical spirit of the present invention on the basis of the principle that an inventor can appropriately define concepts of the terms in order to describe his or her own invention in the best way.

The terms or words used in the present specification and the claims should not be construed as being limited to typical or dictionary meanings, and should be construed as meanings and concepts conforming to the technical spirit of the present invention on the basis of the principle that an inventor can appropriately define concepts of the terms in order to describe his or her own invention in the best way.

In the present invention, the critical micelle concentration may be measured by Brooklyn DV-III (spindle: 63).

In the present invention, for a polymerization conversion ratio, by using a butane tracer equipped with a gas chromatograph, a polymerization conversion ratio curve according to the ratio of an acrylonitrile-based monomer to butane over time under predetermined polymerization conditions may be drawn under each polymerization condition, and a polymerization conversion ratio according to the polymerization condition may be measured.

Through the method for preparing a nitrile-based rubber according to an exemplary embodiment of the present invention, the nitrile-based rubber is prepared by polymerizing a monomer mixture comprising an α,β-unsaturated nitrile-based monomer and a conjugated diene-based monomer in the presence of an initiator and an emulsifier comprising one or more compounds represented by the following Chemical Formula 1.

The initiator may be a radical initiator, and the radical initiator may be one or more selected from the group consisting of an inorganic peroxide, an organic peroxide, and a nitrogen-based compound.

The inorganic peroxide may be one or more selected from the group consisting of sodium persulfate, potassium persulfate, ammonium persulfate, potassium superphosphate, and hydrogen peroxide, and among them, ammonium persulfate is preferred.

The organic peroxide may be one or more selected from the group consisting of di-isobutyl hydroperoxide, t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butylperoxy isobutyrate, and among them, p-menthane hydroperoxide is preferred.

The nitrogen-based compound may be one or more selected from the group consisting of azobis isobutyronitrile, azobis-2,4-dimethylvaleronitrile, azobiscyclohexane carbonitrile, and methyl azobisisobutyrate, and among them, azobis isobutyronitrile is preferred.

Among the initiators, the organic peroxide is preferred.

The initiator may be introduced in an amount of 0.01 to 2 parts by weight, preferably, 0.03 to 1 part by weight, based on 100 parts by weight of the monomer mixture. When the amount of initiator introduced satisfies the above-described range, a rubber having appropriate viscosity and excellent viscoelastic characteristics may be prepared. Further, preparation efficiency may be increased.

The emulsifier comprises one or more compounds represented by the following Chemical Formula 1.

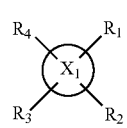

<Chemical Formula 1>

In Chemical Formula 1, $X_1$ is a $C_6$ to $C_{20}$ tetravalent aromatic hydrocarbon or a $C_2$ to $C_{10}$ tetravalent aliphatic hydrocarbon, $R_1$ to $R_4$ are the same as or different from each other, and each independently a $C_2$ to $C_{20}$ monovalent aliphatic hydrocarbon, two of $R_1$ to $R_4$ are represented by —$R_5$—COOH, and $R_5$ is a $C_2$ to $C_{20}$ divalent aliphatic hydrocarbon, one or more of $R_1$ to $R_5$ comprise or do not comprise at least one unsaturated bond, and a total sum of carbon atoms of $X_1$ and $R_1$ to $R_4$ is 30 to 60.

In Chemical Formula 1, it is preferred that the total sum of carbon atoms of $X_1$ and $R_1$ to $R_4$ is 36 to 54.

When the number of carbon atoms and the carboxyl group satisfy the above-described conditions, the amount of emulsifier used may be significantly decreased because it is possible to implement a lower critical micelle concentration than that of a $C_{12}$ to $C_{18}$ fatty acid-based emulsifier in the related art. Accordingly, impurities derived from the emulsifier are decreased, so that the elastic modulus and thermal stability of a rubber product may be improved.

In Chemical Formula 1, $X_1$ may be a $C_6$ to $C_{14}$ tetravalent aromatic hydrocarbon; a $C_3$ to $C_{10}$ tetravalent cyclic aliphatic hydrocarbon which comprises or does not comprise at least one unsaturated bond; or a $C_2$ to $C_7$ tetravalent linear or branched aliphatic hydrocarbon.

The $C_6$ to $C_{14}$ tetravalent aromatic hydrocarbon may be one or more selected from the group consisting of a benzene ring, a naphthalene ring, an anthracene ring, and a phenanthracene ring.

In addition, the $C_3$ to $C_{10}$ tetravalent cyclic aliphatic hydrocarbon may be represented by the following Chemical Formula 2 or 3.

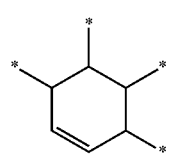

<Chemical Formula 2>

<Chemical Formula 3>

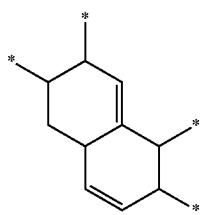

Furthermore, the $C_2$ to $C_7$ tetravalent linear or branched aliphatic hydrocarbon may be represented by the following Chemical Formula 4 or 5.

<Chemical Formula 4>

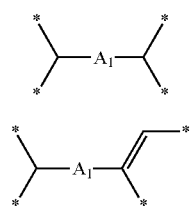

<Chemical Formula 5>

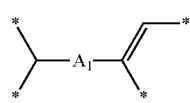

in Chemical Formulae 4 and 5, $A_1$ or $A_2$ may be the same as or different from each other, and each independently a direct bond, methylene, ethylene, propylene, or butylene, and

* may be a position to which $R_1$ to $R_4$ in Chemical Formula 1 are bonded.

Further, $R_1$ to $R_4$ may be the same as or different from each other, and each independently a $C_2$ to $C_{10}$ monovalent aliphatic hydrocarbon, two of $R_1$ to $R_4$ may be represented by —$R_5$—COOH, and $R_5$ may be a $C_2$ to $C_{10}$ divalent aliphatic hydrocarbon.

The compound represented by Chemical Formula 1 has a length of the hydrophobic hydrocarbon chain in the molecule, which is 2 to 3-fold longer than that of a conventional $C_{12}$ to $C_{18}$ fatty acid emulsifier comprising a monocarboxyl group. Due to the long hydrophobic hydrocarbon chain, the compound represented by Chemical Formula 1 may have a low critical micelle concentration, a low content of unsaturated bonds, and excellent thermal stability compared to the conventional fatty acid emulsifier.

Accordingly, in the method for preparing the nitrile-based rubber according to an exemplary embodiment of the present invention, even though an emulsifier comprising the compound represented by Chemical Formula 1 is introduced in a lower content than that of the conventional emulsifier, polymerization may be stably performed due to the low critical micelle concentration of the emulsifier comprising the compound represented by Chemical Formula 1. In addition, the content of impurities derived from the emulsifier in the nitrile-based rubber which is a final product may be decreased, and mechanical properties may be improved for this reason.

The compound represented by Chemical Formula 1 may be one or more selected from the group consisting of the following Chemical Formulae 1-1 to 1-12.

<Chemical Formula 1-1>

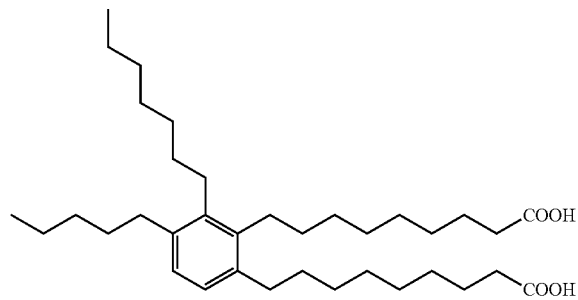

<Chemical Formula 1-2>

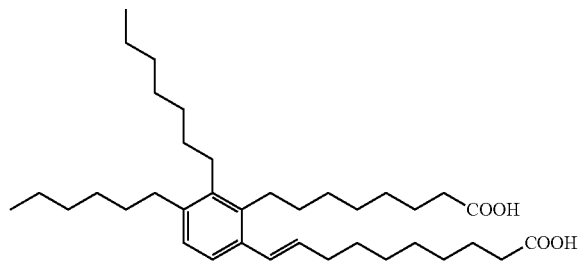

<Chemical Formula 1-3>

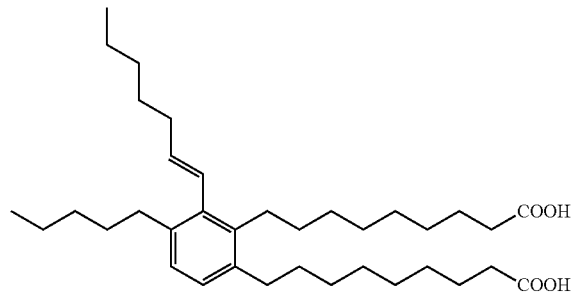

<Chemical Formula 1-4>

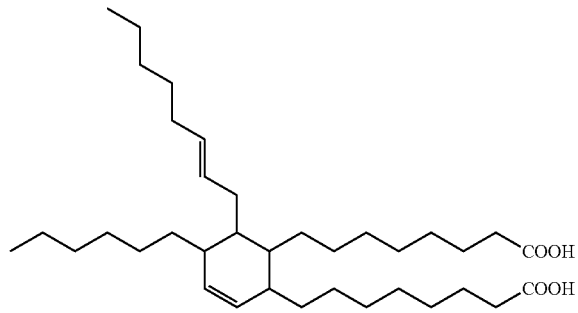

-continued

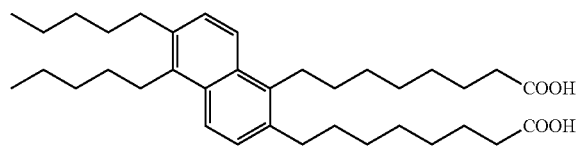
<Chemical Formula 1-5>

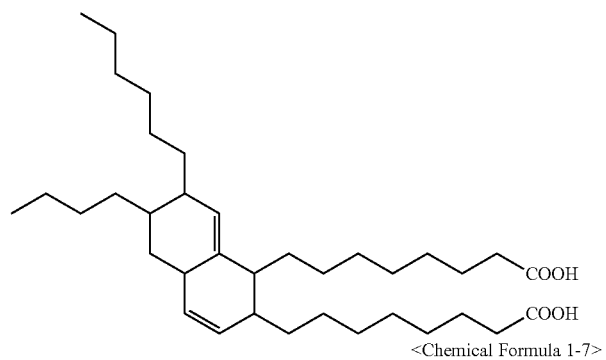
<Chemical Formula 1-6>

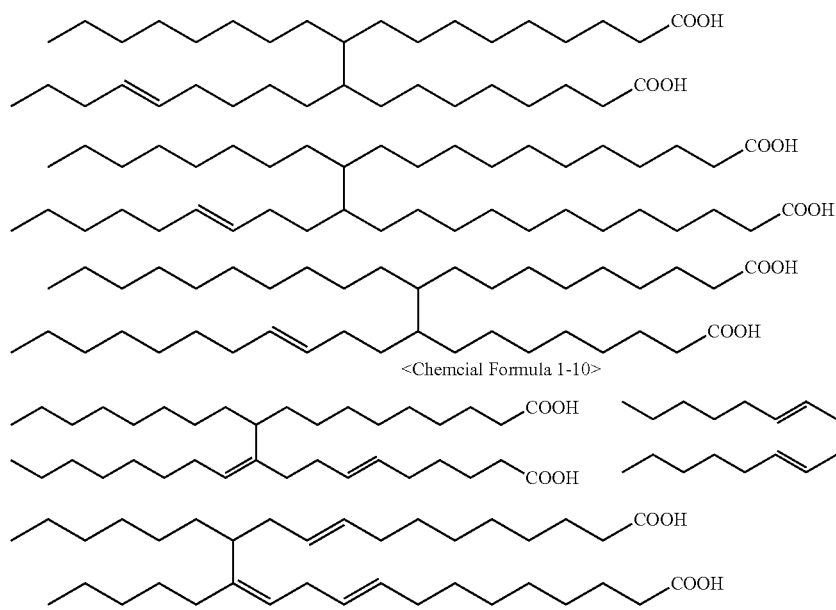

<Chemical Formula 1-7>

<Chemical Formula 1-8>

<Chemical Formula 1-9>

<Chemical Formula 1-10>

<Chemical Formula 1-11>

<Chemical Formula 1-12>

It is preferred that the compound represented by Chemical Formula 1 is one or more selected from the group consisting of the following Chemical Formulae 1-4, 1-6, and 1-11.

The emulsifier may comprise two or more different compounds among the compounds represented by Chemical Formula 1, and it is preferred that the emulsifier comprises all the compounds represented by Chemical Formulae 1-4, 1-6, and 1-11.

In this case, the compound represented by Chemical Formula 1-4 may be included in an amount of 45 to 70 wt %, preferably 50 to 65 wt %, and more preferably 55 to 60 wt %, based on the total weight of the compounds represented by Chemical Formulae 1-4, 1-6, and 1-11.

The compound represented by Chemical Formula 1-6 may be included in an amount of 15 to 40 wt %, preferably 20 to 35 wt %, and more preferably 25 to 30 wt %, based on the total weight of the compounds represented by Chemical Formulae 1-4, 1-6, and 1-11.

The compound represented by Chemical Formula 1-11 may be included in an amount of 1 to 25 wt %, preferably 5 to 20 wt %, and more preferably 10 to 15 wt %, based on the total weight of the compounds represented by Chemical Formulae 1-4, 1-6, and 1-11.

When the above-described content is satisfied, even though a small amount of the emulsifier is introduced, emulsion polymerization may be easily performed, and for this reason, the content of impurities in the nitrile-based rubber is decreased, so that the thermal stability of the nitrile-based rubber, which is a final product, may become significantly excellent.

Two or more compounds represented by Chemical Formula 1 may be prepared during the preparation of the compound represented by Chemical Formula 1, and as a byproduct, one or more selected from the group consisting of a fatty acid having 45 to 60 carbon atoms and a fatty acid having 18 or less carbon atoms may be prepared. Accordingly, the emulsifier of the present invention may further comprise not only the compound represented by Chemical Formula 1, but also one or more selected from the group consisting of a fatty acid having 45 to 60 carbon atoms and a fatty acid having 18 or less carbon atoms.

The emulsifier comprising the compound represented by Chemical Formula 1 may have a critical micelle concentration of 20 to 40 mg/f at 25° C., and it is preferred that the emulsifier has a critical micelle concentration of 25 to 35 mg/i at 25° C. When the critical micelle concentration satisfies the above-described range, the degree of stability of the emulsion polymerization may be further increased due to the low critical micelle concentration.

The emulsifier comprising the compound represented by Chemical Formula 1 may have excellent stability against heat due to a fewer number of unsaturated bonds and a larger number of carbon atoms per molecule than those of a conventional emulsifier.

The emulsifier including the compound represented by Chemical Formula 1 may have a pH of 10 to 12 at 25° C., and it is preferred that the emulsifier has a pH of 10.5 to 11.5 at 25° C. When the pH satisfies the above-described range, the emulsifier is stably dissolved in water, and may properly serve as an emulsifier, and since the emulsifier has appropriate emulsifying performance even in a lower temperature range than the conventional emulsifier, the activity of an initiator may be further improved.

The compound represented by Chemical Formula 1 may be directly synthesized, or those commercially available may be purchased and used.

The emulsifier may further comprise a metal salt of oleic acid.

As the metal salt of oleic acid, an alkali metal salt of oleic acid is preferred, and a potassium salt of oleic acid is more preferred.

The emulsifier may comprise one or more compounds represented by Chemical Formula 1 and a metal salt of oleic acid at a weight ratio of 70:30 to 85:15, and it is preferred that the emulsifier comprises one or more compounds represented by Chemical Formula 1 and the metal salt of oleic acid at a weight ratio of 75:25 to 80:20.

When the weight ratio satisfies the above-described range, even though a small amount of the emulsifier is introduced, emulsion polymerization may be easily performed, and for this reason, the content of impurities in the nitrile-based rubber is decreased, so that the thermal stability of the nitrile-based rubber, which is a final product, may become significantly excellent.

The emulsifier may be included in an amount of 0.3 to 3 parts by weight, more specifically, 0.5 to 1.5 parts by weight, based on 100 parts by weight of the monomer mixture.

When the content of the emulsifier satisfies the above-described range, the amount of impurities derived from the emulsifier in the nitrile-based rubber, which is a final product, may be minimized while the polymerization reaction may be stably performed. Further, the impurities are minimized, so that mechanical properties of the nitrile-based rubber may be improved.

The $\alpha,\beta$-unsaturated nitrile-based monomer may be one or more selected from the group consisting of acrylonitrile, methacrylonitrile, $\alpha$-chloronitrile, and $\alpha$-cyanoethylacrylonitrile, and among them, acrylonitrile is preferred.

The conjugated diene-based monomer may be one or more selected from the group consisting of 1,3-butadiene, 2,3-dimethyl-1,3-butadiene, 2-ethyl-1,3-butadiene, 1,3-pentadiene, and isoprene, and among them, 1,3-butadiene is preferred.

In the method for preparing a nitrile-based rubber, the $\alpha,\beta$-unsaturated nitrile-based monomer and the conjugated diene-based monomer may be introduced at a weight ratio of 15:85 to 45:55, preferably 18:72 to 40:60, and more preferably, 18:72 to 35:65. When the weight ratio satisfies the above-described range, a nitrile-based rubber having excellent flexibility, oil resistance, and tensile strength may be prepared.

In the method for preparing a nitrile-based rubber, the $\alpha,\beta$-unsaturated nitrile-based monomer may be introduced collectively once or dividedly introduced two or more times. When the $\alpha,\beta$-unsaturated nitrile-based monomer is dividedly introduced two or more times, a conjugated diene block may be suppressed from being generated in the nitrile-based rubber which is a final product.

The number of times of introducing the $\alpha,\beta$-unsaturated nitrile-based monomer and the amount of $\alpha,\beta$-unsaturated nitrile-based monomer introduced may be determined according to the polymerization conversion ratio.

In the case where the $\alpha,\beta$-unsaturated nitrile-based monomer is dividedly introduced three times, during the initial period of the polymerization (when the polymerization conversion ratio is 0%), the amount of $\alpha,\beta$-unsaturated nitrile-based monomer introduced may be 50 to 60 wt % based on the total weight of the $\alpha,\beta$-unsaturated nitrile-based monomer, when the polymerization conversion ratio is 20 to 25%, the amount of $\alpha,\beta$-unsaturated nitrile-based monomer introduced may be 20 to 30 wt % based on the total weight of the $\alpha,\beta$-unsaturated nitrile-based monomer and when the polymerization conversion ratio is 45 to 50%, the balance may be introduced.

Further, in the case where the $\alpha,\beta$-unsaturated nitrile-based monomer is dividedly introduced four times, during the initial period of the polymerization (when the polymerization conversion ratio is 0%), the amount of $\alpha,\beta$-unsaturated nitrile-based monomer introduced may be 50 to 60 wt % based on the total weight of the $\alpha,\beta$-unsaturated nitrile-based monomer, when the polymerization conversion ratio is 15 to 20%, the amount of $\alpha,\beta$-unsaturated nitrile-based monomer introduced may be 15 to 25 wt % based on the total weight of the $\alpha,\beta$-unsaturated nitrile-based monomer, when the polymerization conversion ratio is 35 to 40%, the amount of $\alpha,\beta$-unsaturated nitrile-based monomer introduced may be 10 to 15 wt % based on the total weight of the $\alpha,\beta$-unsaturated nitrile-based monomer and when the polymerization conversion ratio is 55 to 60%, the balance may be introduced.

The polymerization may be emulsion polymerization, and may be performed in a temperature range of 5 to 90° C., more specifically, 5 to 50° C.

During the polymerization, an additive for facilitating the polymerization, specifically, one or more selected from the group consisting of a molecular weight modifier, a chelating agent, an oxidizing-reducing agent, a dispersant, a pH adjuster, a deoxidizer, an anti-aging agent, and an oxygen scavenger may be further selectively used.

In the method for preparing a nitrile-based rubber according to an exemplary embodiment of the present invention, coagulation and drying may be further performed after the polymerization.

In order to coagulate polymerized nitrile-based rubber latex, the coagulation may comprise treating the nitrile-based rubber latex with an aqueous inorganic salt solution and forming nitrile-based rubber latex coagulation.

The coagulation using salt may be a process for removing impurities (residual emulsifier, coagulant, and the like) from the nitrile-based rubber latex coagulation and obtaining a nitrile-based rubber. Specifically, the coagulation using salt may be performed by adding the nitrile-based rubber latex to an aqueous inorganic salt solution, and then drying the nitrile-based rubber coagulation.

In this case, the coagulation using salt is not particularly limited and may be performed by a typical method in the art, but specifically, the coagulation may be performed by heating the aqueous inorganic salt solution to 50 to 60° C., and then adding the nitrile-based rubber latex thereto, and stirring the resulting mixture for 10 minutes to 1 hour.

The aqueous inorganic salt solution is prepared by adding distilled water to an inorganic salt and mixing the resulting mixture, and the pH thereof is not particularly limited, but may be 10 to 12.

The inorganic salt may be one or more selected from the group consisting of potassium chloride, sodium chloride, manganese chloride, calcium chloride, magnesium sulfate, and aluminum sulfate. Specifically, the inorganic salt may be calcium chloride.

The drying is for removing remaining moisture in the nitrile-based rubber, and may be performed at 100 to 140° C., specifically, 100 to 120° C.

When the drying satisfies the above-described conditions, the amount of remaining moisture in the nitrile-based rubber is appropriate, and thermal decomposition of the nitrile-based rubber does not occur.

Further, according to another exemplary embodiment of the present invention, a nitrile-based rubber prepared by the preparation method according to an exemplary embodiment of the present invention is provided.

The nitrile-based rubber according to another exemplary embodiment of the present invention may have a Mooney viscosity ($ML_{1+4}$@ 100° C.) of 30 to 80.

In addition, according to still another exemplary embodiment of the present invention, a nitrile-based rubber composition comprising the nitrile-based rubber according to another exemplary embodiment of the present invention is provided.

The nitrile-based rubber composition comprises the nitrile-based rubber as a raw material rubber, and may further comprise an additive so as to satisfy functions and physical properties required according to the use of the nitrile-based rubber composition.

The additive may comprise one or more selected from the group consisting of a vulcanizing agent, a vulcanizing accelerator, a dispersant, a reinforcing filler, and a dissolution accelerator.

The vulcanizing agent may be one or more selected from the group consisting of powdered sulfur, sublimated sulfur, precipitated sulfur, surface-treated sulfur, insoluble sulfur, sulfur chloride, sulfur dichloride, morpholine disulfide, alkylphenol disulfide, N,N'-dithio-bis(hexahydro-2H-azepinone), and polysulfide.

The vulcanizing accelerator may be one or more selected from the group consisting of zinc oxide, N-tert-butyl-2-benzothiazolesulfenamide (TBBS), and tetramethylthiuram monosulfite (TMTM).

The dispersant may be one or more selected from the group consisting of stearic acid, oleic acid, palmitic acid, and (anhydrous)maleic acid.

The reinforcing filler may be one or more selected from the group consisting of carbon black, silica, limestone, mica, clay, and bentonite.

The dissolution accelerator may be one or more selected from the group consisting of di(2-ethylhexyl)adipate, di(2-ethylhexyl)phthalate, and diisodecyl phthalate.

A molded article prepared by using a nitrile-based rubber composition comprising a nitrile-based rubber prepared by the method for preparing a nitrile-based rubber according to an exemplary embodiment of the present invention may exhibit excellent mechanical properties.

Specifically, after being vulcanized at 145° C. for 45 minutes, the nitrile-based rubber composition may have a tensile strength of 270 kg·f/cm$^2$ to 290 kg·f/cm$^2$, an elongation of 470 to 500%, and a 300% modulus of 160 to 170 kg·f/cm$^2$ in accordance with ASTM D412.

MODES OF THE INVENTION

Hereinafter, exemplary embodiments of the present invention will be described in detail such that a person skilled in the art to which the present invention pertains can easily carry out the present invention. However, the present invention can be implemented in various different forms, and is not limited to the Examples described herein.

Example 1

<Preparation of Nitrile-Based Rubber>

0.03 part by weight of p-menthane hydroperoxide as an initiator, 34 parts by weight of acrylonitrile, 66 parts by weight of 1,3-butadiene, 0.5 part by weight of t-dodecyl mercaptan as a molecular weight modifier, 190 parts by weight of water, and 0.5 part by weight of a mixture, in which a fatty acid (CAS No. 67701-19-3) comprising a dimer acid and potassium oleate (CAS No. 143-18-0) were mixed at a weight ratio of 8:2, as an emulsifier were introduced into a reactor.

Subsequently, a polymerization reaction was initiated at 10° C. After 7.8 hours, which is a time point when the conversion ratio was 78%, had elapsed, the polymerization reaction was terminated.

A nitrile-based rubber latex coagulation was prepared by adding an aqueous calcium chloride solution thereto, such that the weight ratio of a prepared nitrile-based rubber latex and calcium chloride in the aqueous calcium chloride solution was 100:2, and heating the resulting mixture at 65° C. to perform coagulation. A nitrile-based rubber was obtained by drying the nitrile-based rubber latex coagulation at 100° C. in an oven.

<Preparation of Nitrile-Based Rubber Composition>

A nitrile-based rubber composition was prepared by introducing 1.5 parts by weight of sulfur as a vulcanizing agent, 3 parts by weight of zinc oxide and 0.7 part by weight of N-tert-butyl-2-benzothiazolesulfenamide (TBBS) as a vulcanizing accelerator, 1 part by weight of stearic acid as a dispersant, and 40 parts by weight of carbon black as a reinforcing filler based on 100 parts by weight of the obtained nitrile-based rubber into a reactor, and mixing the resulting mixture while stirring the mixture at 50 rpm at 50° C. for 8 minutes (pre-mixing for 1 minute and compounding for 7 minutes).

Example 2

A nitrile-based rubber and a nitrile-based rubber composition were prepared in the same manner as in Example 1, except that 1.0 part by weight of a mixture, in which a fatty acid (CAS No. 67701-19-3) comprising a dimer acid and potassium oleate (CAS No. 143-18-0) were mixed at a weight ratio of 8:2, as an emulsifier was introduced thereinto, and the reaction time was 7.5 hours.

Example 3

A nitrile-based rubber and a nitrile-based rubber composition were prepared in the same manner as in Example 1, except that 1.5 parts by weight of a mixture, in which a fatty acid (CAS No. 67701-19-3) comprising a dimer acid and potassium oleate (CAS No. 143-18-0) were mixed at a weight ratio of 8:2, as an emulsifier were introduced thereinto, and the reaction time was 7.5 hours.

Example 4

A nitrile-based rubber and a nitrile-based rubber composition were prepared in the same manner as in Example 1, except that 2.0 parts by weight of a mixture, in which a fatty acid (CAS No. 67701-19-3) comprising a dimer acid and potassium oleate (CAS No. 143-18-0) were mixed at a weight ratio of 8:2, as an emulsifier were introduced thereinto, and the reaction time was 7.5 hours.

Example 5

A nitrile-based rubber and a nitrile-based rubber composition were prepared in the same manner as in Example 1, except that 2.5 parts by weight of a mixture, in which a fatty acid (CAS No. 67701-19-3) comprising a dimer acid and potassium oleate (CAS No. 143-18-0) were mixed at a weight ratio of 8:2, as an emulsifier were introduced thereinto, and the reaction time was 7.4 hours.

The contents of the emulsifiers and the reaction times in the Examples are described in the following Table 1.

TABLE 1

| Classification | Emulsifier (parts by weight) | Reaction time (hours) |
|---|---|---|
| Example 1 | 0.5 | 7.8 |
| Example 2 | 1.0 | 7.5 |
| Example 3 | 1.5 | 7.5 |
| Example 4 | 2.0 | 7.5 |
| Example 5 | 2.5 | 7.4 |

Comparative Example 1

An experiment was performed in the same manner as in Example 1, except that 1.0 part by weight of a $C_{12}$-$C_{18}$ fatty acid (CAS No. 67701-01-3) as an emulsifier was introduced thereinto, but the rubber was not formed.

Comparative Example 2

A nitrile-based rubber and a nitrile-based rubber composition were prepared in the same manner as in Example 1, except that 2.0 parts by weight of a $C_{12}$-$C_{18}$ fatty acid (CAS No. 67701-01-3) as an emulsifier were introduced thereinto, and the reaction time was 8.5 hours.

Comparative Example 3

A nitrile-based rubber and a nitrile-based rubber composition were prepared in the same manner as in Example 1, except that 3.0 parts by weight of a $C_{12}$-$C_{18}$ fatty acid (CAS No. 67701-01-3) as an emulsifier was introduced thereinto, and the reaction time was 7.8 hours.

The contents of the emulsifier and the reaction times in the Comparative Examples are summarized and described in the following Table 2.

TABLE 2

| Classification | Emulsifier (parts by weight) | Reaction time (hours) |
|---|---|---|
| Comparative Example 1 | 1.0 | Rubber not formed |
| Comparative Example 2 | 2.0 | 8.5 |
| Comparative Example 3 | 3.0 | 7.8 |

Experimental Example 1: Evaluation of Physical Properties of Nitrile-Based Rubber The Mooney viscosities of the nitrile-based rubbers in the Examples and the Comparative Examples were measured, and the results are described in the following Table 3.

1) Mooney viscosity (MV): The Mooney viscosity was measured by performing pre-heating with a large rotor at 100° C. for 1 minute and measuring and reading a value 4 minutes after the rotor was driven, using a Mooney viscometer (MV2000, Alpha Technologies Co., Ltd.).

TABLE 3

| Classification | Mooney viscosity |
|---|---|
| Example 1 | 45.8 |
| Example 2 | 45.5 |
| Example 3 | 44.4 |
| Example 4 | 45.2 |
| Example 5 | 44.9 |
| Comparative Example 2 | 45.2 |
| Comparative Example 3 | 44.4 |

Referring to Table 3, it could be confirmed that there was no big difference among the Mooney viscosities of the nitrile-based rubbers in Examples 1 to 5 and Comparative Examples 2 and 3. Through this, it can be confirmed that when the same emulsifiers as in Examples 1 to 5 are used, even the reaction time can be shortened by using only a small amount of emulsifier, and physical properties of the prepared nitrile-based rubbers are also at a level equal to or higher than those of the conventional rubber.

Experimental Example 2: Evaluation of Physical Properties of Nitrile-Based Rubber Composition The Mooney viscosities, vulcanization characteristics, and mechanical properties of the nitrile-based rubber compositions in the Examples and the Comparative Examples were measured by the following methods, and the results are described in the following Tables 4 and 5.

2) Physical Properties

C-Mooney viscosity (C-MV): After vulcanization at 145° C. for 45 minutes, the Mooney viscosity was measured by performing pre-heating with a large rotor at 100° C. for 1 minute and measuring and reading a value 4 minutes after the rotor was driven, using a Mooney viscometer (MV2000, Alpha Technologies Co., Ltd.).

Hardness: After vulcanization at 145° C. for 45 minutes, the hardness was measured at 25° C. in accordance with ASTM D2240, and the unit is on the Shore D scale.

3) Vulcanization Characteristics

The maximum torque (MH) value during vulcanization at 170° C. was measured by using an oscillating disc rheometer.

Further, Ts' (time taken to achieve 1% vulcanization) and Tc'90 (time when the rubber composition is vulcanized to 90%) were measured. In this case, the Tc'90 means a vulcanization rate.

4) Mechanical Characteristics

Elongation (e %): After vulcanization at 145° C. for 45 minutes, the elongation of a vulcanized product was measured in accordance with ASTM D412.

Tensile strength (kg·f/cm$^2$): After vulcanization at 145° C., the tensile strength of a 300% vulcanized product was measured in accordance with ASTM D412.

300% modulus (kg·f/cm$^2$): After vulcanization at 145° C. for 45 minutes, the modulus during the 300% elongation was measured in accordance with ASTM D412.

TABLE 4

| Classification | | Example 1 | Example 2 | Example 3 | Example 4 | Example 5 |
|---|---|---|---|---|---|---|
| Physical properties | C-MV | 77.8 | 77.4 | 76.5 | 77.1 | 77.3 |
| | Hardness | 71.0 | 72.0 | 72.0 | 72.0 | 72.0 |
| Vulcanization characteristics | MH (dNm) | 17.5 | 17.1 | 17.4 | 17.3 | 17.4 |
| | TS'1 (min) | 1.41 | 1.43 | 1.49 | 1.45 | 1.44 |
| | TS'90 (min) | 6.44 | 6.47 | 6.51 | 6.43 | 6.40 |
| Mechanical properties | TS (kg·f/cm$^2$) | 271.20 | 283.40 | 279.2 | 277.2 | 273.7 |
| | Elongation (%) | 494.20 | 481.50 | 472.4 | 460.2 | 474.4 |
| | 300% Modulus (kg·f/cm$^2$) | 162.60 | 168.00 | 163.6 | 162.5 | 163.4 |

TABLE 5

| Classification | | Comparative Example 2 | Comparative Example 3 |
|---|---|---|---|
| Physical properties | C-MV | 77.7 | 76.3 |
| | Hardness | 72.0 | 72.0 |
| Vulcanization characteristics | MH (dNm) | 16.7 | 15.7 |
| | TS'1 (min) | 1.49 | 1.51 |
| | TS'90 (min) | 6.55 | 6.86 |
| Mechanical properties | TS (kg·f/cm$^2$) | 261.3 | 260.4 |
| | Elongation (%) | 441.2 | 445.3 |
| | 300% Modulus (kg·f/cm$^2$) | 152.1 | 155.6 |

Referring to Tables 4 and 5, the nitrile-based rubber compositions in Examples 1 to 5 and the nitrile-based rubber compositions in Comparative Examples 2 and 3 were similar to each other in Mooney viscosity, hardness, and vulcanization characteristics.

However, the tensile strengths of the nitrile-based rubber compositions in Examples 1 to 5 were better by a maximum of 23.0 kg·f/cm$^2$ to a minimum of 9.9 kg·f/cm$^2$, compared to those of the nitrile-based rubber compositions in Comparative Examples 2 and 3. Further, the elongations of the nitrile-based rubber compositions in Examples 1 to 5 were better by a maximum of 53% to a minimum of 14.9%, compared to those of the nitrile-based rubber compositions in Comparative Examples 2 and 3. The 300% modulus of the nitrile-based rubber compositions in Examples 1 to 5 were better by a maximum of 15.9 kg·f/cm$^2$ to a minimum of 6.9 kg·f/cm$^2$, compared to those of the nitrile-based rubber compositions in Comparative Examples 2 and 3.

In addition, as in the results shown in Examples 4 and 5, it can be seen that even though a content similar to that of the conventional emulsifier is introduced, there is no advantage in physical properties of the rubber according to the additional introduction.

Judging from the results as described above, it could be confirmed that in the nitrile-based rubber prepared by the preparation method of the present invention, an emulsifier could be used in a smaller amount than that of the conventional emulsifier, impurities in the nitrile-based rubber were decreased, and for this reason, mechanical properties became excellent.

The invention claimed is:

1. A method for preparing a nitrile-based rubber, comprising polymerizing a monomer mixture comprising an α,β-unsaturated nitrile-based monomer and a conjugated diene-based monomer, in the presence of an initiator; and an emulsifier comprising one or more compounds represented by the following Chemical Formula 1:

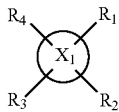

<Chemical Formula 1> in Chemical Formula 1, $X_1$ is a $C_6$ to $C_{20}$ tetravalent aromatic hydrocarbon or a $C_2$ to $C_{10}$ tetravalent aliphatic hydrocarbon, $R_1$ to $R_4$ are the same as or different from each other, and two of $R_1$ to $R_4$ are each independently a $C_2$ to $C_{20}$ monovalent aliphatic hydrocarbon, and the other two of $R_1$ to $R_4$ are each independently represented by —$R_5$—COOH, wherein $R_5$ is a $C_2$ to $C_{20}$ divalent aliphatic hydrocarbon, one or more of $R_1$ to $R_5$ comprise or do not comprise at least one unsaturated bond, and a total sum of carbon atoms of $X_1$ and $R_1$ to $R_4$ is 30 to 60.

2. The method of claim 1, wherein a total sum of carbon atoms of $X_1$ and $R_1$ to $R_4$ is 36 to 54.

3. The method of claim 1, wherein $R_1$ to $R_4$ are the same as or different from each other, and two of $R_1$ to $R_4$ are each independently a $C_2$ to $C_{10}$ monovalent aliphatic hydrocarbon, and the other two of $R_1$ to $R_4$ are each independently represented by —$R_5$—COOH, wherein $R_5$ is a $C_2$ to $C_{10}$ divalent aliphatic hydrocarbon.

4. The method of claim 1, wherein $X_1$ is a $C_6$ to $C_{14}$ tetravalent aromatic hydrocarbon; a $C_3$ to $C_{10}$ tetravalent cyclic aliphatic hydrocarbon which comprises or does not comprise at least one unsaturated bond; or a $C_2$ to $C_7$ tetravalent linear or branched aliphatic hydrocarbon.

5. The method of claim 4, wherein the $C_6$ to $C_{14}$ tetravalent aromatic hydrocarbon is one or more selected from a group consisting of a benzene ring, a naphthalene ring, an anthracene ring, and a phenanthracene ring, the $C_3$ to $C_{10}$ tetravalent cyclic aliphatic hydrocarbon is represented by the following Chemical Formula 2 or 3, and the $C_2$ to $C_7$ tetravalent linear or branched aliphatic hydrocarbon is represented by the following Chemical Formula 4 or 5:

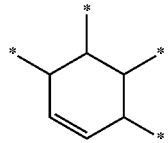

<Chemical Formula 2>

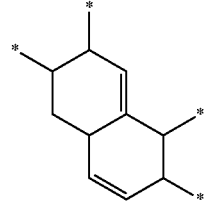

<Chemical Formula 3>

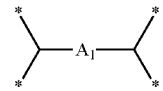

<Chemical Formula 4>

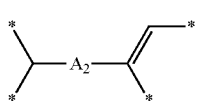

<Chemical Formula 5>

* is a position to which $R_1$ to $R_4$ in Chemical Formula 1 are bonded, in Chemical Formulae 4 and 5, $A_1$ or $A_2$ is the same as or different from each other, and each independently a direct bond, methylene, ethylene, propylene, or butylene.

6. The method of claim 1, wherein the compound represented by Chemical Formula 1 is one or more selected from a group consisting of the following Chemical Formulae 1-1 to 1-12:

<Chemical Formula 1-1>

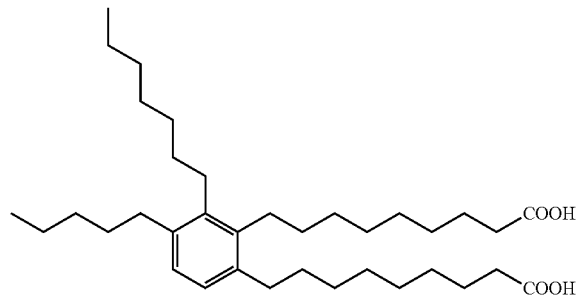

<Chemical Formula 1-2>

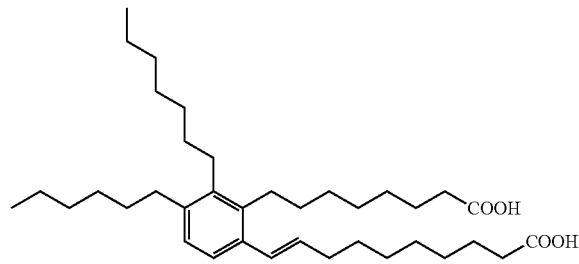

<Chemical Formula 1-3>

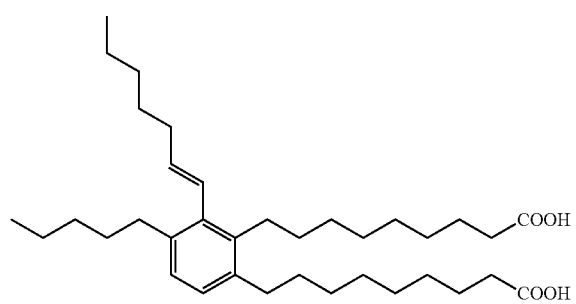

<Chemical Formula 1-4>

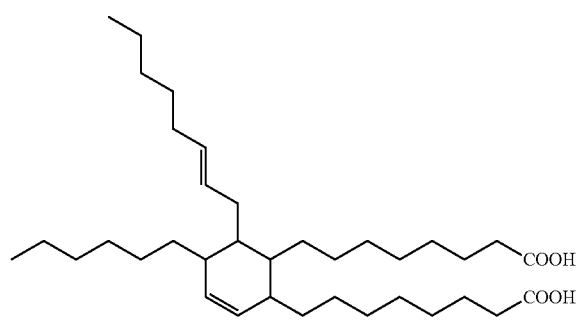

<Chemical Formula 1-5>

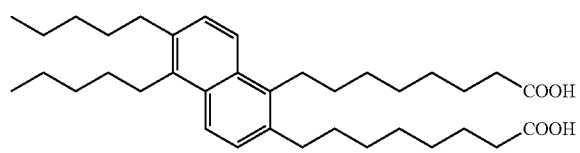

<Chemical Formula 1-6>

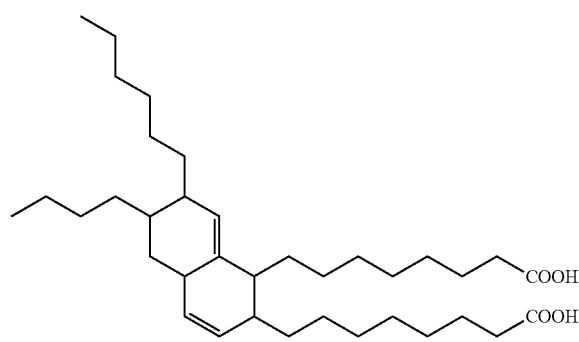

<Chemical Formula 1-7>

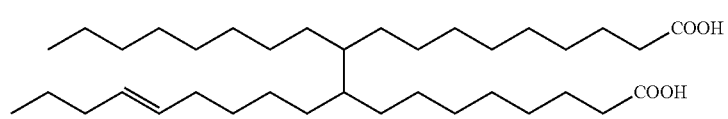

<Chemical Formula 1-8>

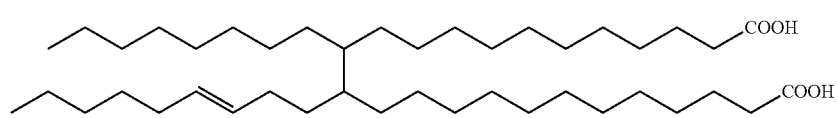

<Chemcial Formula 1-9>

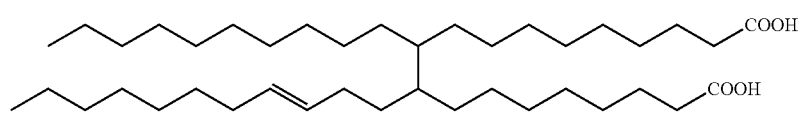

-continued

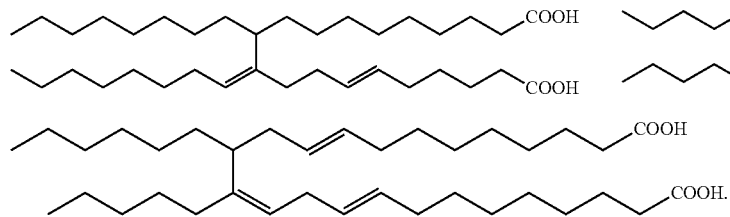

<Chemcial Formula 1-10>

<Chemcial Formula 1-11>

<Chemcial Formula 1-12>

7. The method of claim 1, wherein the compound represented by Chemical Formula 1 is one or more selected from a group consisting of the following Chemical Formulae 1-4, 1-6, and 1-11:

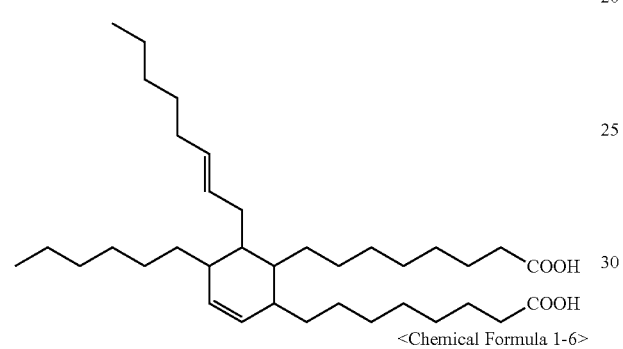

<Chemical Formula 1-4>

<Chemical Formula 1-6>

<Chemical Formula 1-11>

8. The method of claim 1, wherein the emulsifier comprises two or more different compounds among the compounds represented by Chemical Formula 1.

9. The method of claim 1, wherein the emulsifier further comprises a metal salt of oleic acid.

10. The method of claim 1, wherein the emulsifier is included in an amount of 0.5 to 1.5 parts by weight based on 100 parts by weight of the monomer mixture.

11. The method of claim 1, wherein the polymerization is emulsion polymerization.

12. The method of claim 1, further comprising performing coagulation and drying after the polymerization.

13. A nitrile-based rubber prepared by the method according to claim 1.

14. A nitrile-based rubber composition comprising the nitrile-based rubber according to claim 13.

15. The nitrile-based rubber composition of claim 14, further comprising one or more selected from a group consisting of a vulcanizing agent, a vulcanizing accelerator, a dispersant, a reinforcing filler, and a dissolution accelerator.

16. The method of claim 8, wherein the emulsifier comprises a compound represented by Chemical Formula 1-4, a compound represented by Chemical Formula 1-6, and a compound represented by Chemical Formula 1-11:

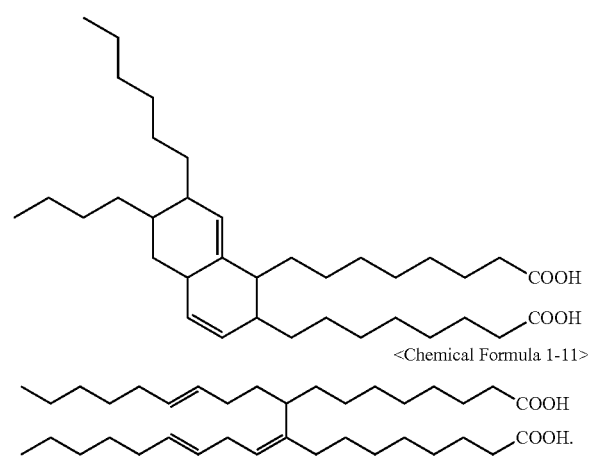

<Chemical Formula 1-4>

<Chemical Formula 1-6>

<Chemical Formula 1-11>

17. The method of claim 16, wherein the compound represented by Chemical Formula 1-4 is present in an amount of 45 to 70 wt %, the compound represented by Chemical Formula 1-6 is present in an amount of 15 to 40 wt %, and the compound represented by Chemical Formula 1-11 is present in an amount of 1 to 25 wt % based on the total weight of the compounds represented by Chemical Formula 1.

18. The method of claim 9, wherein the compounds represented by Chemical Formula 1 and the metal salt of oleic acid are in a weight ratio of 70:30 to 85:15.

19. The method of claim 1, wherein α,β-unsaturated nitrile-based monomer and the conjugated diene-based monomer are in a weight ratio of 15:85 to 45:55.

20. The method of claim 1, wherein α,β-unsaturated nitrile-based monomer is introduced dividedly two or more times.

* * * * *